United States Patent [19]

Don-Yehiya

[11] Patent Number: 5,590,973
[45] Date of Patent: Jan. 7, 1997

[54] QUICK CONNECTOR

[75] Inventor: Yehuda Don-Yehiya, Kiryat Yam, Israel

[73] Assignee: State of Israel Rafael-Armament Development Authority, Haifa, Israel

[21] Appl. No.: 384,044

[22] Filed: Feb. 6, 1995

[30] Foreign Application Priority Data

Feb. 9, 1994 [IL] Israel ......................................... 108605

[51] Int. Cl.$^6$ ............................. B25G 3/18; F16B 21/00; A47B 96/06; G03B 29/00
[52] U.S. Cl. .......................... 403/325; 403/320; 403/374; 403/409.1; 403/DIG. 8; 248/187.1; 248/228.2; 248/231.31; 248/316.2; 411/354
[58] Field of Search ..................................... 403/320, 323, 403/325, 373, 374, 381, DIG. 8, 409.1; 354/75, 76, 80, 81, 293; 248/316.7, 187.1, 228.2, 231.31; 411/354

[56] References Cited

U.S. PATENT DOCUMENTS

| | | | |
|---|---|---|---|
| 3,356,325 | 12/1967 | Schnase | 248/187.1 |
| 3,549,113 | 12/1970 | Pagliuso | 248/187.1 |
| 4,570,887 | 2/1986 | Banister | 248/187.1 |
| 4,786,204 | 11/1988 | Mayeda | 411/354 X |
| 4,929,973 | 5/1990 | Nakatani | 354/293 |
| 5,222,826 | 6/1993 | Hanke | 403/381 |
| 5,230,490 | 7/1993 | Sloop | 248/187.1 |

*Primary Examiner*—Blair Johnson
*Assistant Examiner*—Bruce A. Lev
*Attorney, Agent, or Firm*—Mark M. Friedman

[57] ABSTRACT

A connector for detachably connecting a first body and a second body together. The connector includes an insert which is attached to the first body. The insert has a first edge which features an outwardly inclining portion and further features an opposing edge which includes a protrusion. The connector further includes a base member attached to the second body. The base member includes a rotatable shaft which is adjacent the first edge of the insert when the insert is seated in the base member. The base member further includes an overhang which is adjacent to the opposing edge of the insert when the insert is seated in the base member and is directed toward the shaft. The shaft of the base member is shaped so as to alternately secure the insert by confining the inclined edge and the protrusion of the opposing edge of the insert member and release the insert, depending on the rotational position of the shaft.

12 Claims, 3 Drawing Sheets

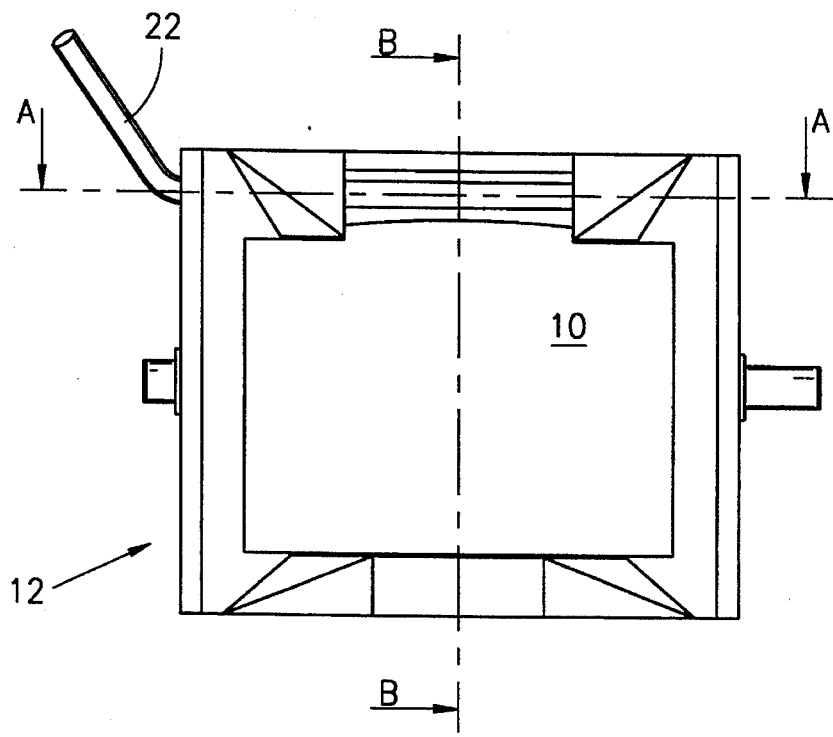
FIG.4
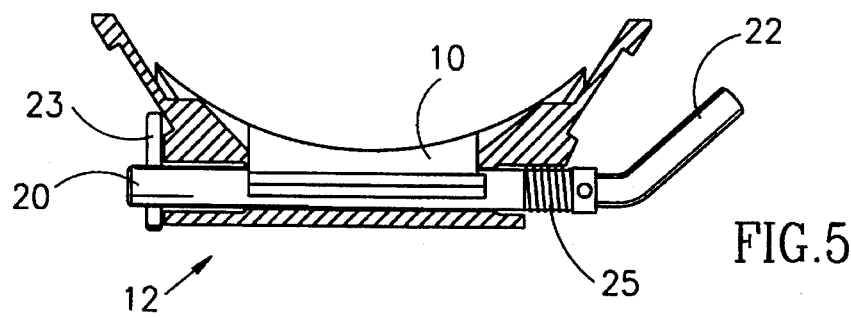
FIG.5
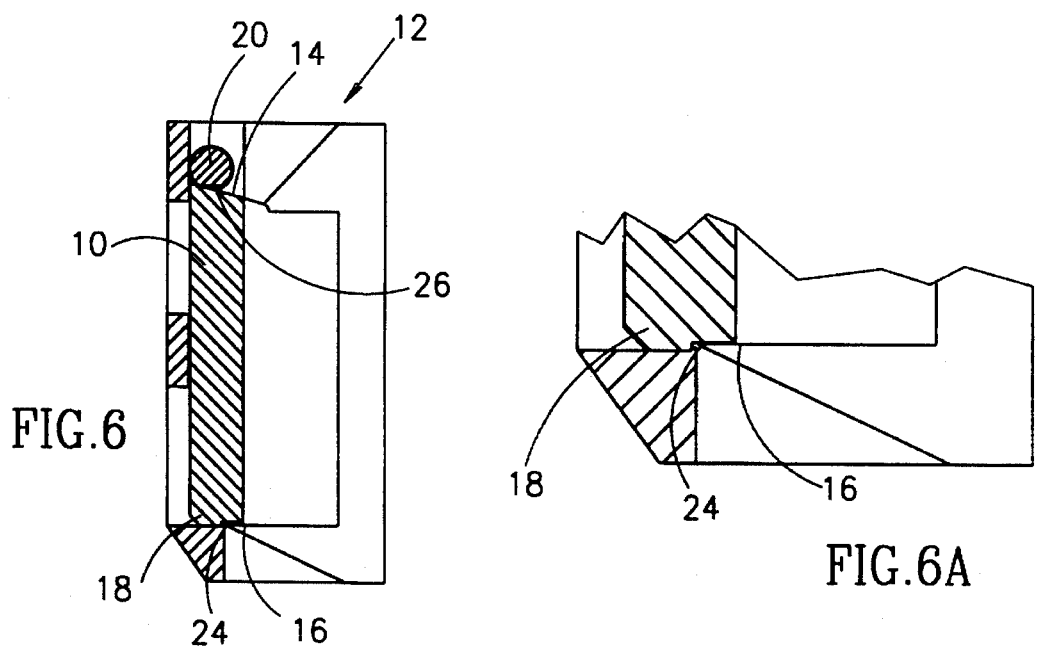
FIG.6
FIG.6A 5,590,973

QUICK CONNECTOR

FIELD AND BACKGROUND OF THE INVENTION

The present invention relates to quick connectors and, more particularly, to quick connectors which allow the rapid and sure connection and disconnection of two members for example, a mounting tripod and a camera, missile launcher, and the like.

In a variety of contexts, it is desirable to be able to quickly, accurately and securely connect two members together. For example, a photographer may wish to alternately connect and disconnect a camera to and from a tripod. Another application might be in the connection and disconnection of an anti-tank missile launcher and a tripod which are normally separately transported and connected just prior to use.

In these applications, the connection and disconnection must at times be executed rapidly. In addition, the camera or missile launcher and the tripod must be accurately connected so that the two are properly aligned. Finally, the camera or missile launcher must be securely connected to the tripod so as to eliminate the possibility of the inadvertent separation of the two members.

A variety of connectors are in current use. Various clamps offer quick connection and disconnection but do not normally offer an accurate or secure connection. Various screw mechanisms offer a secure connection but are rather slow to deploy and remove and may be less than totally accurate since most screw mechanisms can be screwed to various extents.

There is thus a widely recognized need for, and it would be highly advantageous to have, a connector which will quickly, accurately and securely connect two members and rapidly disconnect them.

SUMMARY OF THE INVENTION

According to the present invention, there is provided a connector for detachably connecting a first body and a second body together, comprising: (a) an insert member attached to, or integrally formed with, the first body, the insert member having a first edge which features an outwardly inclining portion, the insert further featuring an opposing edge which includes a protrusion; and (b) a base member attached to, or integrally formed with, the second body, the base member including a rotatable shaft adjacent the first edge of the insert when the insert is seated in the base member, the base member further including an overhang adjacent the opposing edge of the insert when the insert is seated in the base member and directed toward the shaft, the shaft of the base member being so shaped as to alternately secure the insert by confining the inclined edge and the protrusion of the opposing edge of the insert member and release the insert, depending on the rotational position of the shaft.

According to further features in preferred embodiments of the invention described below, the shaft is substantially cylindrical in cross-section except that a portion of the shaft features a first reduced-diameter region, preferably flattened, the first reduced-diameter region connecting directly with the cylindrical periphery of the shaft, the first reduced-diameter region serving to exert pressure against the insert as the shaft is rotated so as to contact the insert.

According to still further features in the described preferred embodiments, the flattened first reduced-diameter region connects to the cylindrical periphery of the shaft through at least one transitional reduced-diameter region of diameter which continuously increases to the diameter or the shaft, the transitional reduced-diameter region serving to exert pressure against the insert as the shaft is rotated.

According to still other features in preferred embodiments according to the present invention, the shaft further features a second flattened region adjacent the point of connection of the first flattened reduced-diameter region and the cylindrical periphery of the shaft, the second flattened region serving to lock the shaft into position about the insert so that the second flattened region is contiguous with the outwardly inclining portion of the insert.

The present invention successfully addresses the shortcomings of the presently known configurations by providing a quick connector which can be used to quickly and accurately reversibly connect two bodies without the need for screwing or alignment.

BRIEF DESCRIPTION OF THE DRAWINGS

The invention is herein described, by way of example only, with reference to the accompanying drawings, wherein:

FIG. 4 is a top view of the quick connector of FIG. 1;

FIG. 5 is a side cross-sectional view of the quick connector of FIG. 1 along cut A—A of FIG. 4;

FIG. 6 is a is a side cross-sectional view of the quick connector of FIG. 1 along cut B—B of FIG. 4;

FIG. 6A is an enlarged portion of FIG. 6.

DESCRIPTION OF THE PREFERRED EMBODIMENTS

The present invention is of a quick connector which can be used to quickly and accurately connect two members to each other.

The principles and operation, of a quick connector according to the present invention may be better understood with reference to the drawings and the accompanying description.

Figure 1:
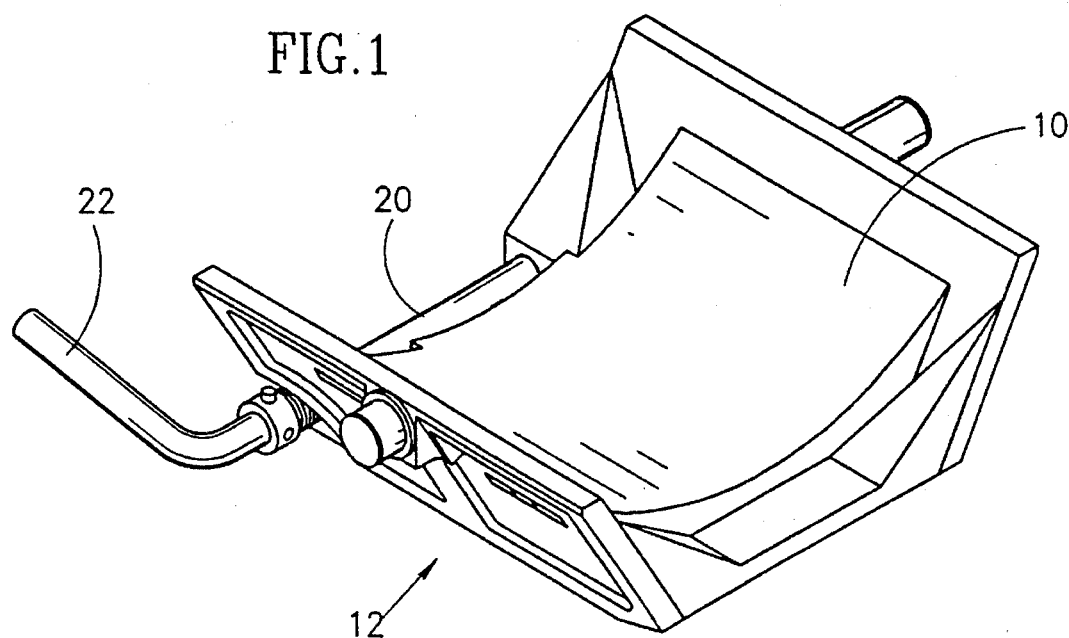
FIG. 1 is a perspective view of a typical quick connector according to the present invention.

Referring now to the drawings, FIG. 1 illustrates, in perspective view, an example of an embodiment according to the present invention. The quick connector is made up of two portions, an insert 10 and a base member 12. Insert 10 will typically be permanently or quasi-permanently connected to, or integrally formed with, a first body (not shown), such as, for example, a camera or a missile launcher, while base member 12 will typically be permanently or quasi-permanently connected to, or integrally formed with, a second body (not shown), such as, for example, a tripod.

Figure 2:
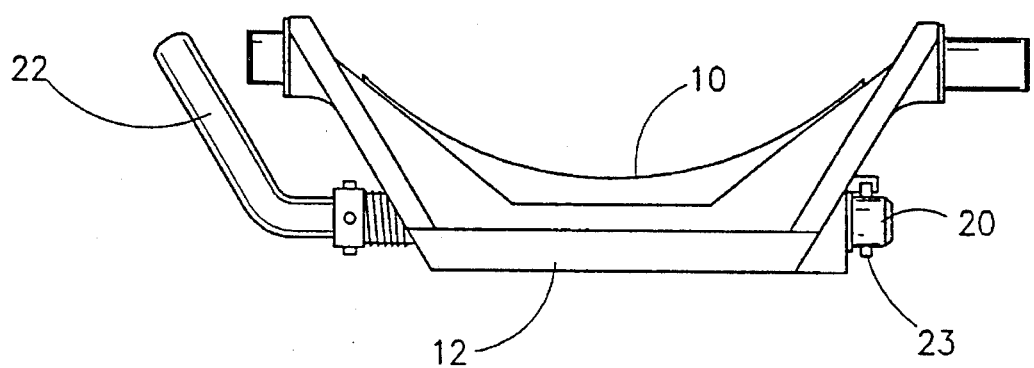
FIG. 2 is a side view of the quick connector of FIG. 1.
Figure 3:
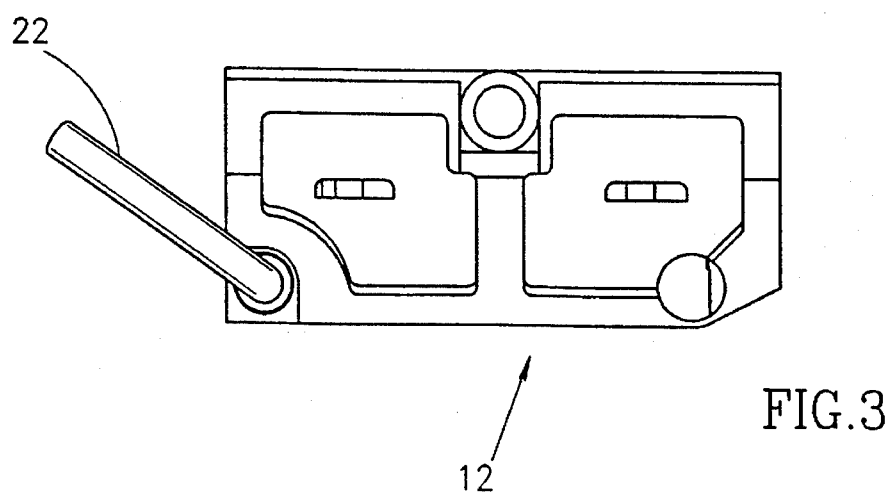
FIG. 3 is another side view of the quick connector of FIG. 1.

Shown in FIGS. 2, 3 and 4 are two side views and a top view, respectively, of the quick connector of FIG. 1. As can be seen, insert 10 and the concave portion of base member 12, in which insert 10 is seated, are sized and dimensioned so that insert 10 fits accurately within base member 12.

Figure 8:
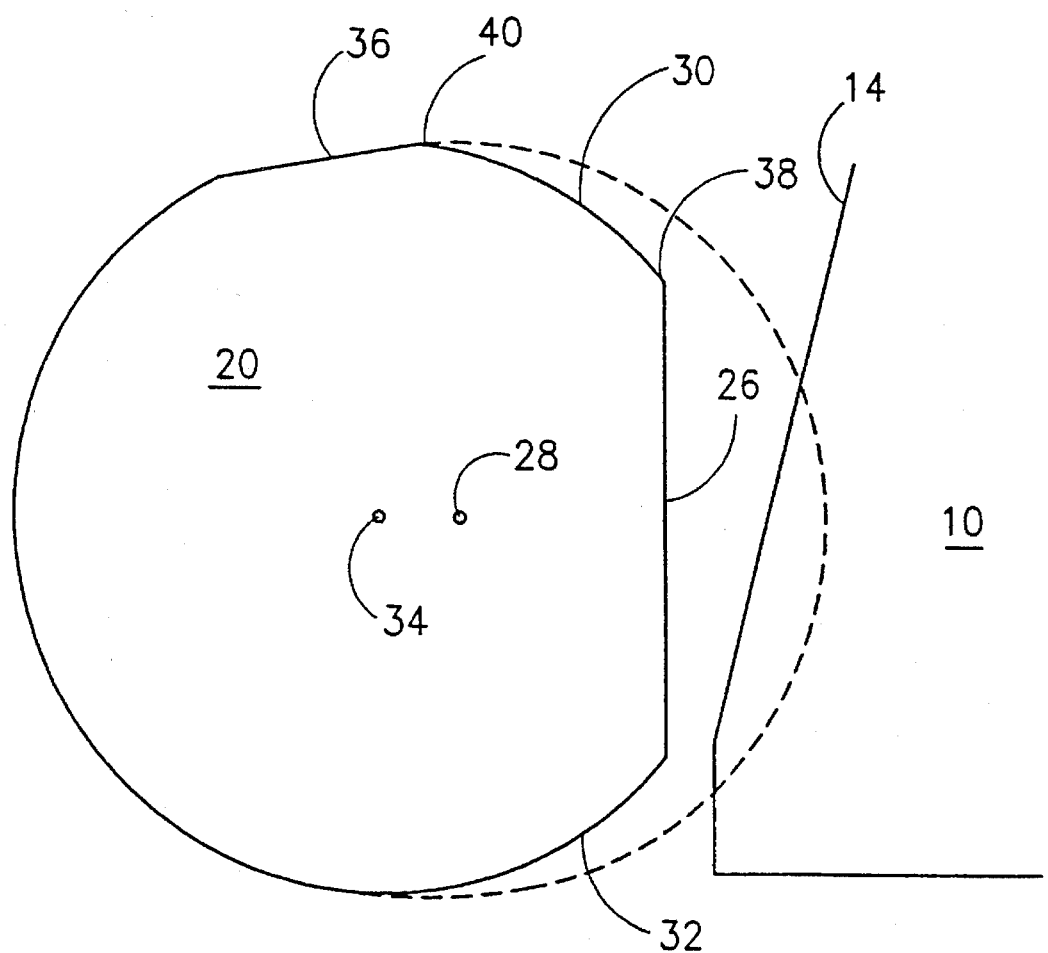
FIG. 8 is a further magnified close-up view of the upper left-hand corner of the cross-sectional view of FIG. 6, showing one possible shape of the shaft.

Shown in FIGS. 5 and 6 are two cross-sectional views, along section lines A—A and B—B of FIG. 4, respectively. As can best be seen from FIG. 6, insert 10, which is preferably substantially rectangular in projection (FIG. 4), includes a first edge 14, a portion of which is outwardly inclining. Insert 10 further includes an opposing edge 16 which includes a protrusion 18. The function of inclined first edge 14 and protrusion 18 of opposing edge 16 is described below. Preferably, the lower portions of insert 10 are vertical rather than inclined as can be seen in FIG. 8.

Base member 12 includes a rotatable shaft 20 which is adjacent inclined first edge 14 of insert 10 when insert 10 is seated in base member 12. Preferably, shaft 20 is connected to, or is integrally formed with, a handle 22 which serves to facilitate the manual rotation of shaft 20 as described below. Preferably also, shaft 20 is confined by a locking pin 23 and features a spring 25 or other biasing mechanism, to bias handle 22 in one sense, preferably, so as to disconnect insert 10 from base member 12. In addition, shaft 20 is seated with the help of somewhat flexible seating members (not shown) so as to give shaft 20 some play, the function of which is described below.

Base member 12 further includes an overhang 24 adjacent opposing edge 16 of insert 10 when insert 10 is seated in base member 12 (FIG. 6). Overhang 24 is directed toward shaft 20.

Shaft 20 is sized and dimensioned so as to alternately secure insert 10 to base member 12 by confining inclined first edge 14 of insert 10 and protrusion 18 of opposing edge 16 of insert 10, and to release insert 10, depending on the rotational position of shaft 20, as described in more detail below.

Figure 7:
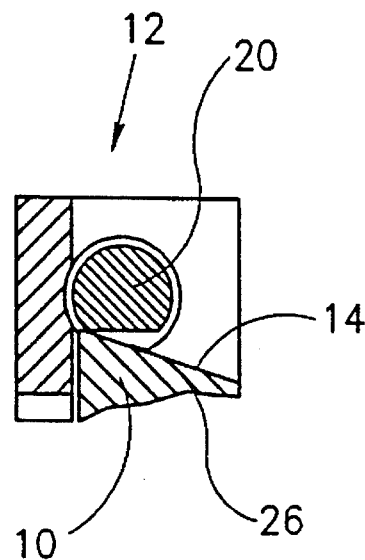
FIG. 7 is a close-up view of the upper left-hand corner of the cross-sectional view of FIG. 6.

To better understand how a device according to the present invention operates, reference is now made to FIGS. 5–7 and especially to FIG. 8 which show that shaft 20, at least the portion of shaft 20 which adjoins inclined first edge 14 of insert 10, is not perfectly cylindrical. As can be seen in FIG. 6 and, in close-up view, in FIG. 7, shaft 20 features a first reduced-diameter region 26 having a diameter (or diameters), or radial distance, which is (or are) less than the diameter of the cylindrical portion of shaft 20. First reduced-diameter region 26 serves to exert pressure against insert 10 as shaft 20 is rotated so as to contact insert 10, as is described in more detail below.

First reduced-diameter region 26 can have any of a large number of suitable geometries provided that the radial distance from the geometric and rotational axis of the cylindrical portion of shaft 20, designated 28 (FIG. 8), is smaller than the radius of the cylindrical portion of shaft 20, which is shown as dotted lines in FIG. 8. Preferably, first reduced-diameter region 26 is flattened, similar to the configuration shown in FIG. 8.

First reduced-diameter region 26 can connect directly with the cylindrical periphery of shaft 20. Preferably, the connection is indirect and is effected through at least one transitional reduced-diameter region 30 having a diameter, or radial distance, which continuously increases in going from the flattened regions to the fall diameter or shaft 20, as shown in FIG. 8. Transitional reduced-diameter region 30, serves to exert pressure against insert 10 as shaft 20 is rotated.

The embodiment shown in FIG. 8 features a second transitional reduced-diameter region 32. The precise shape of transitional reduced-diameter region 30 may be set in various ways. For example, in FIG. 8, the shape of transitional reduced-diameter region 30 was obtained by cutting shaft 20 along an arc formed about a secondary centerline 34 and using the radius of the cylindrical portion of shaft 20.

Preferably, in any of the embodiments described above, shaft 20 also includes a locking flattened region 36 (FIG. 8) which is adjacent the point of connection of first reduced-diameter region 26 or transitional reduced-diameter region 30 and the cylindrical periphery of shaft 20. Locking flattened region 36 serve to lock shaft 20 into position about insert 10 so that locking flattened region 36 is contiguous with outwardly inclining edge 14 of insert 10.

To use a device according to the present invention to firmly, accurately and quickly connect two bodies, insert 10 (which is connected to one of the bodies) is first dropped into base member 12 (which is connected to the other body). The complementary shapes of insert 10 and base member 12 ensures that the two are properly seated with respect to each other. Spring 25 (FIG. 5) biases shaft 20 to the open position so as to enable base member 12 to accept insert 10.

At this point insert 10 is seated within base member 12, as shown in FIG. 6, with inclined edge of insert 10 free to move and with protrusion 18 of opposing edge 16 of insert 10 seated below overhang 24 of base member 12.

With the two members properly seated (FIG. 8), the operator manually rotates handle 22 through a certain clockwise angle. As shaft 20 rotates clockwise (FIG. 8), there comes a point when a leading edge 38 of the reduced-diameter portion of shaft 20 first contacts inclined edge 14 of insert 10. Further clockwise rotation of shaft 20 causes shaft 20 to press laterally against insert 10 with progressively increasing force as the point of contact moves along transitional reduced-diameter region 30. The lateral pressure serves to immobilize insert 10 between shaft 10 and overhang 24 of base member 12. The certain amount of play, or give, available to shaft 20 is instrumental in allowing the further rotation of shaft 20.

Further rotation brings the point of contact between shaft 20 and insert 12 to the leading edge 40 of locking flattened region 36. Continued rotation leads to a slight reduction in the lateral pressure exerted by shaft 20 on insert 10 and serves to establish contact between shaft 20 and insert 10 along the entire length of locking flattened region 36, thereby effectively locking insert 10 in its immobilized position.

To disconnect insert 10 front base member 12, shaft 20 is rotated counterclockwise. A certain force is required to disengage locking flattened regions 36 of shaft 20 from insert 10. Once the point of contact between shaft 20 and insert 10 has become leading edge 40, less force is required to completely disconnect the two members, most or all of which force may be supplied by spring 25 or other biasing mechanism.

The result is the very quick connection and disconnection of two bodies, with the connection being such that the two bodies are precisely aligned and securely held without requiring tedious alignment or the laborious screwing or clamping of the two bodies.

While the invention has been described with respect to a single preferred embodiment, it will be appreciated that many variations, modifications and other applications of the invention may be made.

What is claimed is:

1. A connector for detachably connecting a first body and a second body together, comprising:

(a) an insert member attached to the first body, said insert member having a first edge which features an outwardly inclining portion having a first planar contact area, said insert member further featuring an opposing edge which includes a protrusion; and (b) a base member attached to the second body, said base member including a substantially horizontal rotatable shaft adjacent said first edge of said insert member when said insert member is seated in said base member, said base member further including an overhang adjacent said opposing edge of said insert member when said insert member is seated in said base member and directed toward said shaft, said shaft of said base member featuring a flattened locking region having a second planar contact area, said flattened locking region serving to lock said shaft into a locked position adjacent said insert member so that substantially all of said second planar contact area of said flattened locking region is contiguous with substantially all of said first planar contact area of said outwardly inclining portion of said first edge of said insert member, thus alternately securing said insert member by confining said outwardly inclining portion of said first edge of said insert member and said protrusion of said opposing edge of said insert member, and releasing said insert member, depending on the rotational position of said shaft.

2. The connector as in claim 1, wherein said shaft is substantially cylindrical in cross section a part from said flattened locking region, except that a portion of said shaft features a reduced-diameter region, said reduced-diameter region connecting directly with the cylindrical periphery of said shaft, said reduced-diameter diameter region serving to exert pressure against said insert member as said shaft is rotated so as to contact said insert member.

3. The connector as in claim 2, wherein said reduced diameter region is flattened.

4. The connector as in claim 3, wherein said flattened locking region is adjacent the point of connection of said flattened reduced-diameter region and the cylindrical periphery of said shaft.

5. The connector as in claim 3, wherein said flattened reduced-diameter region connects to the cylindrical periphery of said shaft through at least one transitional reduced-diameter region of diameter which continuously increases to the diameter of said shaft, said transitional reduced-diameter region serving to exert pressure against said insert member as said shaft is rotated.

6. The connector as in claim 5, wherein said flattened locking region is adjacent the point of connection of said at least one transitional reduced-diameter region and the cylindrical periphery of said shaft.

7. A connector for detachably connecting a first body and a second body together, comprising:

(a) an insert member integrally formed with the first body, said insert member having a first edge which features an outwardly inclining portion having a first planar contact area, said insert member further featuring an opposing edge which includes a protrusion; and (b) a base member integrally formed with the second body, said base member including a substantially horizontal rotatable shaft adjacent said first edge of said insert member when said insert member is seated in said base member, said base member further including an overhang adjacent said opposing edge of said insert member when said insert member is seated in said base member and directed toward said shaft, said shaft of said base member featuring a flattened locking region having ring a second planar contact area, said flattened locking region serving to lock said shaft into a locked position adjacent said insert member so that substantially all of said second planar contact area of said flattened locking region is contiguous with substantially all of said first planar contact area of said outwardly inclining portion of said first edge of said insert member, thus alternately securing said insert member by confining said outwardly inclining portion of said first edge of said insert member and said protrusion of said opposing edge of said insert member, and releasing said insert member, depending on the rotational position of said shaft.

8. The connector as in claim 7, wherein said shaft is substantially cylindrical in cross section apart from said flattened locking region, except that a portion of said shaft features a reduced-diameter region, said reduced-diameter region connecting directly with the cylindrical periphery of said shaft, said reduced-diameter region serving to exert pressure against said insert member as said shaft is rotated so as to contact said insert member.

9. The connector as in claim 8, wherein said reduced diameter region is flattened.

10. The connector as in claim 9, wherein said flattened locking region is adjacent the point of connection of said flattened reduced-diameter region and the cylindrical periphery of said shaft.

11. The connector as in claim 9, wherein said flattened reduced-diameter region connects to the cylindrical periphery of said shaft through at least one transitional reduced-diameter region of diameter which continuously increases to the diameter of said shaft, said transitional reduced-diameter region serving to exert pressure against said insert member as said shaft is rotated.

12. The connector as in claim 11, wherein said flattened locking region is adjacent the point of connection of said at least one transitional reduced-diameter region and the cylindrical periphery of said shaft.

* * * * *

UNITED STATES PATENT AND TRADEMARK OFFICE
CERTIFICATE OF CORRECTION

PATENT NO. : 5,590,973
DATED : January 7, 1997
INVENTOR(S) : Yehuda DON-YEHIYA

It is certified that error appears in the above-indentified patent and that said Letters Patent is hereby corrected as shown below:

Column 5 at line 30, delete the second "diameter" so that the phrase reads, "said reduced-diameter region ..."

Column 6 at line 13, delete the word "ring".

Signed and Sealed this

Eighteenth Day of March, 1997

Attest:

BRUCE LEHMAN

*Attesting Officer*  Commissioner of Patents and Trademarks